United States Patent [19]
Ando et al.

[11] Patent Number: 5,943,313
[45] Date of Patent: Aug. 24, 1999

[54] INFORMATION STORAGE MEDIUM AND INFORMATION REPRODUCING APPARATUS HAVING A WOBBLING PRE-GROOVE

[75] Inventors: Hideo Ando, Tokyo; Mikio Yamamuro, Yokohama, both of Japan

[73] Assignee: Kabushiki Kaisha Toshiba, Kawasaki, Japan

[21] Appl. No.: 09/049,113

[22] Filed: Mar. 27, 1998

[30] Foreign Application Priority Data

Mar. 28, 1997 [JP] Japan ................................. 9-078535

[51] Int. Cl.$^6$ ........................................ G11B 7/24
[52] U.S. Cl. ................................. 369/275.4; 369/275.1; 369/44.13
[58] Field of Search ........................ 369/275.4, 275.3, 369/275.1, 109, 110, 112, 275.2, 13, 44.37, 44.13, 44.29, 47, 44.35, 111, 124

[56] References Cited

U.S. PATENT DOCUMENTS

| | | | |
|---|---|---|---|
| 4,858,218 | 8/1989 | Takagi et al. | 369/109 |
| 5,144,552 | 9/1992 | Abe | 369/275.4 |
| 5,210,738 | 5/1993 | Iwata et al. | 369/275.1 |
| 5,493,552 | 2/1996 | Kobori | 369/109 |
| 5,537,373 | 7/1996 | Horikiri | 369/44.13 |

FOREIGN PATENT DOCUMENTS 0100995  2/1984  European Pat. Off. .

*Primary Examiner*—Ali Neyzari
*Attorney, Agent, or Firm*—Pillsbury Madison & Sutro LLP

[57] ABSTRACT

An information storage medium, which is manufactured with high yield and is little influenced by a reproducing apparatus, and an information reproducing apparatus capable of performing stable information reproduction. The information storage medium has a pre-groove with a groove-like, continuous projection-and-recess shape and a pre-pit with an intermittent projection-and-recess shape. A level difference (depth or height) of the projection and recess of the pre-pit is substantially equal to that of the pre-groove. Each of the pre-pit and pregroove has a recording surface wobbling along a predetermined curved line. A reproduction signal from the information storage medium having the recording surface can be obtained by at least one pair of a preamplifier and a digitizing circuit.

20 Claims, 11 Drawing Sheets

INFORMATION STORAGE MEDIUM AND INFORMATION REPRODUCING APPARATUS HAVING A WOBBLING PRE-GROOVE

BACKGROUND OF THE INVENTION

The present invention relates to information storage media represented by compact disks (CD), laser disks (LD), compact disk-type read-only memory disks (CD-ROM), and digital versatile disk-type video disks (DVD), from which previously recorded information can be reproduced by using converged light; or optical disks (MO, OD, MD), from which previously recorded information can be reproduced by using converged light and in which previously recorded information can be rewritten by using converged light; and once-write-type CD-ROM disks (CD-R) among, which permit writing of information. The present invention also relates to information reproducing apparatuses for reproducing information from information storage media, writing information to information storage media, or rewriting previously recorded information to information storage media.

On an information storage medium wherein optical characteristics, magnetic characteristics, or the shape in the local area of a recording film surface varies by using converged light to form small record marks so information is written or rewritten, pre-grooves for decreasing track pitch are formed. Track pitch determines radial intervals of record marks. The pre-grooves are arranged in groove shapes on the recording film surface on which record marks are to be formed.

During information recording, a pre-groove (continuous groove) is traced by using a converged beam spot produced by a recording/reproducing apparatus, and record marks are successively formed in the pre-groove or on a land portion between pre-grooves.

The pre-groove is basically formed in a continuous spiral shape on a recording surface of the information storage medium. However, if microscopically viewed, the pre-groove is interrupted at boundaries of sectors, by the sectors which are very finely divided along the pre-groove. Pre-pits having very small concave shapes are formed at the interrupt portions between the pre-grooves. For example, the pre-pits have information representing the sector numbers assigned to the individual sectors. In many cases, the pre-pits also have sync codes representing a reference clock at the time of information reproduction.

Suppose that a diameter of a reproducing beam spot having central intensity $e^{-2}$ is Ws, the wavelength of the reproduced light is $\lambda$, the refractive index of a transparent plastic base plate of the information storage is n, the width of the pre-groove is Wt, the depth of the pre-groove is dt, the width of the pre-pit is Wp, and the depth of the pre-pit is dp. When a laser beam emitted from an optical head of the information reproducing apparatus is converged on the information storage medium through an objective lens, and a pre-pit signal is reproduced based on the variation in the amount of light which is included in reflected light from the information storage medium and has passed back through the objective lens, the maximum reproduction signal is obtained when the following condition is satisfied:

$$Wp \approx Ws/3, dt \approx \lambda/(4n) \quad\quad (A)$$

When a push-pull method is employed, wherein light, which has been reflected by the information storage medium and has passed back through the objective lens, is divided into two components by wave front division with respect to a straight line including a center axis and a difference between the two components is detected to find a tracking error, the maximum tracking error signal is obtained when the following condition is satisfied:

$$Wt \approx Ws/2, dp \approx \lambda/(8n) \quad\quad (B)$$

If the width and depth of the pre-pit are plotted on the abscissa and a detection signal is plotted on the ordinate of a graph, a maximum value is obtained when formula (B) is satisfied. Thus, even if the width and depth of the pre-pit vary slightly near the optimal values, the detection signal does not vary substantially. In contrast, when the width and depth of the pre-pit depart from optimal values, the detection signal varies greatly even if the width and depth only slightly vary.

However, for reasons relating to the manufacture described below, it is difficult to form both the pre-pit and pre-groove with optimal shapes. The following problems arise.

1) Either the pre-pit shape or the pre-groove shape is less regarded during manufacture, and the detection signal of the less regarded one decreases and the precision of detection deteriorates.

2) Since either the pre-pit shape or the pre-groove shape is not formed with the optimal shape, the detection signal varies very sensitively to a slight variation in depth or width. As a result, detection signals vary greatly from manufacturing lot to manufacturing lot of information storage media, and the manufacturing yield of information storage media decreases considerably. Since output signals depart from maximum values if the optimal conditions are not met, as described above, detection signals vary greatly in relation to the variation in width and depth.

3) The amount of exposure light on a primary disk of a primary disk recording apparatus for information storage media needs to vary in at least three levels (three-level exposure amount including zero-level). It is very difficult to vary the exposure amount stably in multiple levels and to ensure high exposure precision in each level.

4) As a result, there is difficulty in manufacturing information storage media, manufacturing yield decreases, and the manufacturing cost of information storage media increases.

The structure of the conventional information storage medium as well as the method of manufacturing the same will now be described, and some problems in the prior art will be explained in detail.

The information storage medium is manufactured by the steps (a) to (e):

a) forming a primary disk,
b) forming a stamper by electroforming plating,
c) forming a plastic base plate by injection molding,
d) forming a recording film by deposition, and
e) bonding.

Pre-grooves and pre-pits are first formed on the recording film by step (a), forming the primary disk.

The most important problem in this case is that the pre-groove and pre-pit have different optimal depths ($dt \approx \lambda/(4n)$; $dp \approx \lambda/(8n)$).

In order to meet the two depth conditions, the use of a photoresist layer having a two-layer structure was proposed. However, high-quality recording cannot be achieved due to cross-talk between the two layers of the photoresist in the exposure/development step.

Even when two layers, a metal film of, e.g. Te (tellurium) and a photoresist layer, are used, this structure cannot practically be used because of rims of Te near the holes.

Considering the above, in order to stably form pre-grooves and pre-pits with high productivity, it is essential to use a single-layer photoresist in forming a primary disk. This condition is unchanged even now.

Under such circumstances, in the prior art, the amount of exposure light on the photoresist layer is controlled in the step of exposing the primary disk, thereby varying the depths of the pre-groove and pre-pit.

FIG. 1 shows the shapes and dimensions of the thus obtained pre-grooves and pre-pits on the primary disk. If the transfer efficiency in the steps (b), (c), and (d) in the primary disk manufacturing process is 100%, the shapes and dimensions of the pre-grooves and pre-pits formed on the recording film of the information storage medium agree with those of the pre-grooves and pre-pits formed on the primary disk.

Referring to FIG. 1, the depth dt of the pre-groove 11 is about $\lambda/(8n)$. The reason is that the laser beam does not reach the bottom face of the photoresist layer (i.e. the position of a glass plate) because the light amount of the laser beam is set at a low level, despite the thickness dr of the photoresist layer being set at $\lambda/(4n)$. In addition, since the exposure amount is small, the width Wt of the pre-groove 11 is very narrow.

By contrast, the depth dp of the pre-pit 12 is about $\lambda/(4n)$ which is equal to the thickness dr of the photoresist layer, because the light amount of the laser beam is increased and the photoresist layer can be exposed even to the bottom face thereof. The width Wp of the pre-pit 12 is, as mentioned above, Wp≈Ws/3.

Consequently, the conventional structure of the information storage medium, as shown in FIG. 2, has the following problems:

Although the shape of the pre-pit 12 is determined to obtain a maximum reproduction signal, the width Wt of the pre-groove 11 is very small and greatly differs from an ideal value, Wt≈Ws/2. Thus, a tracking error detection signal obtained by a push-pull method decreases greatly. Because of the deficiency of the detection signal, the information reproducing apparatus cannot stably control the tracking, and tracking errors often arise.

If the conditions for manufacture are the same, the depth dt of the pre-groove 11 is dt≈$\lambda/(8n)$. However, the depth dt greatly varies due to a slight variation in conditions for development in a developing step (e.g., concentration of developing liquid, developing time, room temperature at the time of development). As a result, amplitudes of tracking error detection signals vary greatly from manufacturing lot to manufacturing lot. When information is to be reproduced by the information reproducing apparatus, a tracking error control circuit cannot be used in the case of a specific information storage medium since it oscillates due to an excessively large tracking error detection signal. In the case of another information storage medium, the tracking error detection signal is too large to stably correct a tracking error, and tracking errors often arise.

SUMMARY OF THE INVENTION

The object of the present invention is to provide an information storage medium, which is manufactured with high yield and is little influenced by a reproducing apparatus, and an information reproducing apparatus capable of performing stable information reproduction.

This invention provides an information storage medium permitting reproduction of information by converged light. Such an information storage medium includes, a pre-groove having a groove-like, continuous projection-and-recess shape; and a pre-pit formed of an intermittent recess/projection and having a depth substantially equal to a projection/recess of the pre-groove.

This invention also provides an information storage medium permitting reproduction of information by converged light that includes;

a pre-groove having a groove-like, continuous projection-and-recess shape; and a pre-pit having an intermittent projection-and-recess shape, wherein a depth of the pre-groove satisfies the following condition:

$$m\lambda/(2n)+\lambda/(8n)<dt<m\lambda/(2n)+3\lambda/(8n)$$

where
m=an integer,
n=a refractive index of a plastic base plate, and
$\lambda$=a wavelength of a light beam to be used.

This invention also provides an information reproducing apparatus capable of recording or reproducing, by converged light, information in or from an information storage medium having a pre-groove with a groove-like, continuous projection-and-recess shape, and a pre-pit with an intermittent projection-and-recess shape, information storage medium permitting write or rewriting by converged light. The apparatus includes:

a first preamplifier which produces a signal from the pre-pit;

a second preamplifier which produces a record mark formed by writing or rewriting information;

a first digitizing circuit which digitizes the signal obtained from the first preamplifier; and a second digitizing circuit which digitizes a signal obtained from the second preamplifier, wherein at least one pair selected from the pair of the first and second preamplifiers and the pair of the first and second digitizing circuits are shared.

This invention also provides an information reproducing apparatus capable of recording or reproducing, by converged light, information in or from an information storage medium having a pre-groove with a groove-like, continuous projection-and-recess shape, and a pre-pit with an intermittent projection-and-recess shape. The information storage medium permits writing or rewriting by converged light. The apparatus includes:

a first preamplifier which reproduces a signal from the pre-pit;

a second preamplifier which reproduces a record mark formed by writing or rewriting information;

a first digitizing circuit which digitizes the signal obtained from the first preamplifier; and a second digitizing circuit which digitizes a signal obtained from the second preamplifier, wherein at least one pair selected from the pair of the first and second preamplifiers and the pair of the first and second digitizing circuits are shared, and a ratio of an allowable amplitude variation in the second preamplifier, $(Io-I\gamma)/(I\zeta-I\xi)$, satisfies the condition:

$$10>(Io-I\gamma)/(I\zeta-I\xi)>1/10,$$

where $I\zeta$=a signal amount at a maximum level in a vertical range of a reproduction signal associated with the projection-and-recess in a region of the pre-groove or a non-pre-groove region, where $I\xi$=a signal amount at a minimum signal level associated with an information mark, as compared to a level at which no light is returned, when an information mark of a predetermined shape is formed on the region of the pre-groove or the non-pre-groove region, Iγ=an output signal from the second preamplifier in association with the projection-and-recess of the pre-groove portion or the non-pre-groove portion, and Io=an output signal from the second preamplifier in association with a region without the projection-and-recess of the pre-groove portion or the non-pre-groove portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 schematically shows the condition of a recording surface of a conventional information storage medium;

FIG. 2 schematically information example of an information reproducing apparatus for reproducing information from the information storage medium shown in FIG. 1;

DETAILED DESCRIPTION OF THE INVENTION

An embodiment of the present invention will now be described with reference to the accompanying drawings.

First, the process of fabricating an information storage medium of the present invention will be described with reference to FIGS. 4A to 4E and FIGS. 5A to 5F.

Figure 4A:
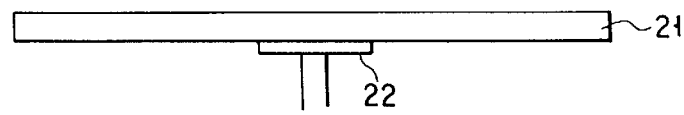
FIGS. 4A to 4E show the steps of manufacturing the information storage medium shown in FIG. 3.

As is shown in FIG. 4A, a tempered glass plate 21, about 0.5 to 30 mm thick, is placed on a spindle motor 22 and rotated for a specific number of rotations, thereby ensuring surface precision.

A photoresist liquid dissolved in an organic solvent is coated on the glass plate 21, and the photoresist liquid is uniformly spread by using the centrifugal force of the rotating glass plate 21. This coating method is called a spinner coating method.

Figure 4B:
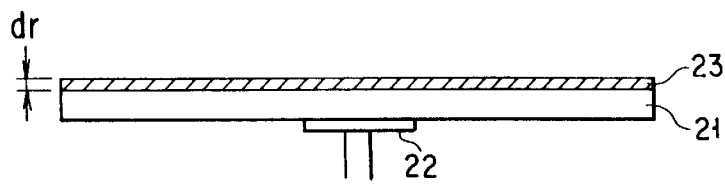

Then, as shown in FIG. 4B, the glass plate 21 is left for a predetermined time period at high temperatures of 60 to 300° C., and the organic solvent is evaporated. Thus, a photoresist layer 23 with uniform thickness dr is formed. In this case, it is supposed that there is no decrease in transfer efficiency as mentioned later in the steps of FIGS. 5A to 5F. If the transfer efficiency is 100% throughout all steps, the thickness dr of the photoresist 23 corresponds to the depth of the pre-pit or pre-groove of a recording film 34 of the finished information storage medium.

Figure 4C:
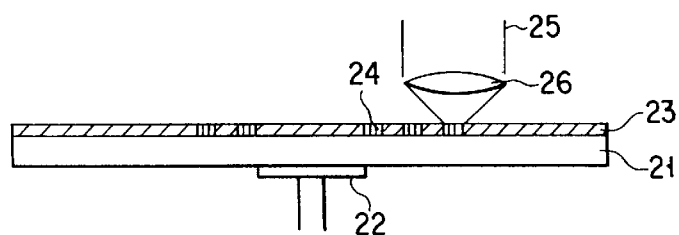

Subsequently, as shown in FIG. 4C, a laser beam 25 is converged on the photoresist layer 23 through an objective lens 26 and the photoresist 23 is exposed intermittently, thereby forming exposed portions 24.

Figure 4D:
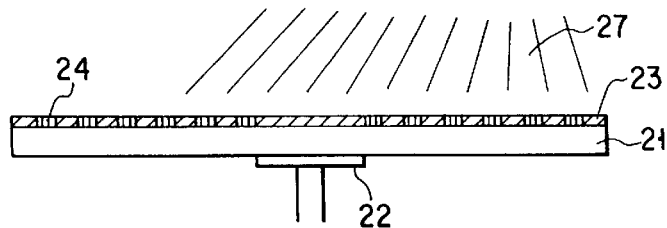

In FIG. 4D, the glass plate 21 which has been exposed is removed from a primary disk recording apparatus, and a developing liquid 27 is supplied to the glass plate 21 while the glass plate 21 is being rotated. Thus, the photoresist layer 23 is developed.

Figure 4E:
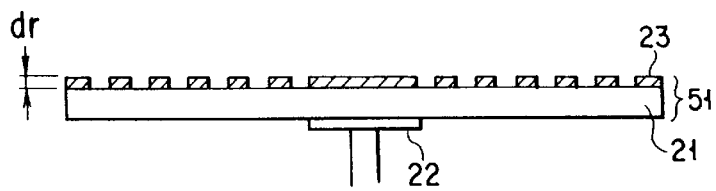

If the development of the photoresist layer 23 is completed, the exposed portions 24 are dissolved, as shown in FIG. 4E, and projections and recesses with height (depth) dr are formed. The combination of the glass plate 21 and photoresist layer 23 is called a primary disk 51 of the information storage medium.

Figure 5A:
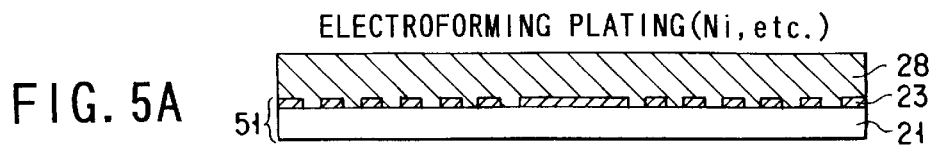
FIGS. 5A to 5F show the steps following the step shown in FIG. 4E.

As is shown in FIG. 5A, a projection-and-recess pattern on the primary disk 51 is duplicated by electroless plating using, e.g., Ni (nickel) or electroplating (electroforming plating), and a replica is formed. The replica is called a master plate 28.

Using an organic solvent, such as acetone, the photoresist layer 23 between the primary disk 51 and master plate 28 is removed, and the master plate 51 is separated from the primary disk 51.

Figure 5B:
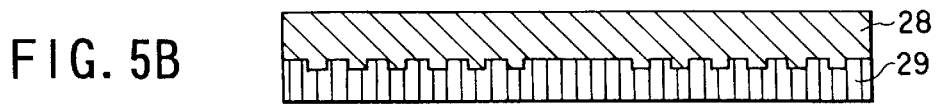

Based on the master plate 28, a mother plate 29 is formed by electroplating (electroforming plating), as shown in FIG. 5B. Then, based on the mother plate 29, a stamper 30 is formed by electroplating (electroforming plating).

In general, a transparent plastic base plate 33 of the information storage medium is formed by injection molding.

Figure 5C:
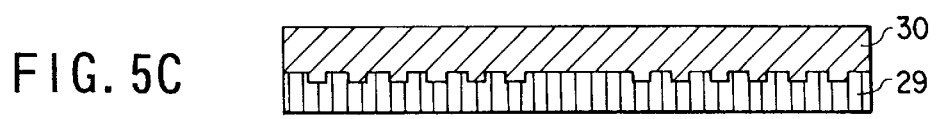
Figure 5D:
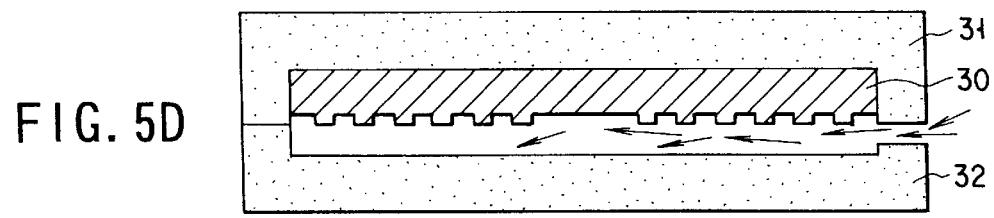

Specifically, as shown in FIG. 5D, a molten resin material (generally, polycarbonate (PC), acryl (PMMA), or ABS) is put in a space between metal mold A 31 and metal mold B 32. The stamper 30 formed in the preceding step is attached to the metal mold A 31. At the time the resin material is inserted, a fine projection-and-recess pattern of the stamper 30 is transferred onto the resin material.

The metal mold A 31 and metal mold B 32 in which the resin material is inserted are left for several minutes and cooled to room temperature. When the resin material is cooled and solidified, the metal mold A 31 is separated from the metal mold B 32 and the plastic base plate 33 (the resin material on which the projection-and-recess pattern has been transferred is referred to as "plastic base plate") is taken out.

Figure 5E:
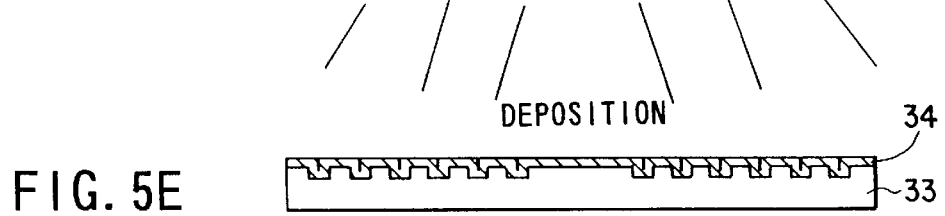

The plastic base plate 33 is disposed in a vacuum, and a recording film 34 is formed on the plastic base plate 33 by deposition, such as vacuum deposition or ion plating, as shown in FIG. 5E.

Figure 5F:
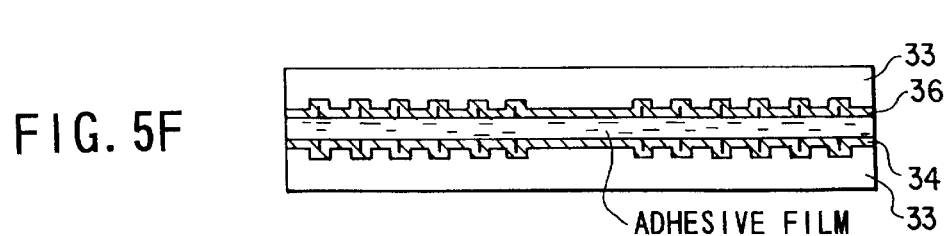

The two recording films 34 and 36 formed are arranged to face each other, and an adhesive film (not labelled); is filled between them, and the information storage medium, as shown in FIG. 5F, is obtained.

Figure 6:
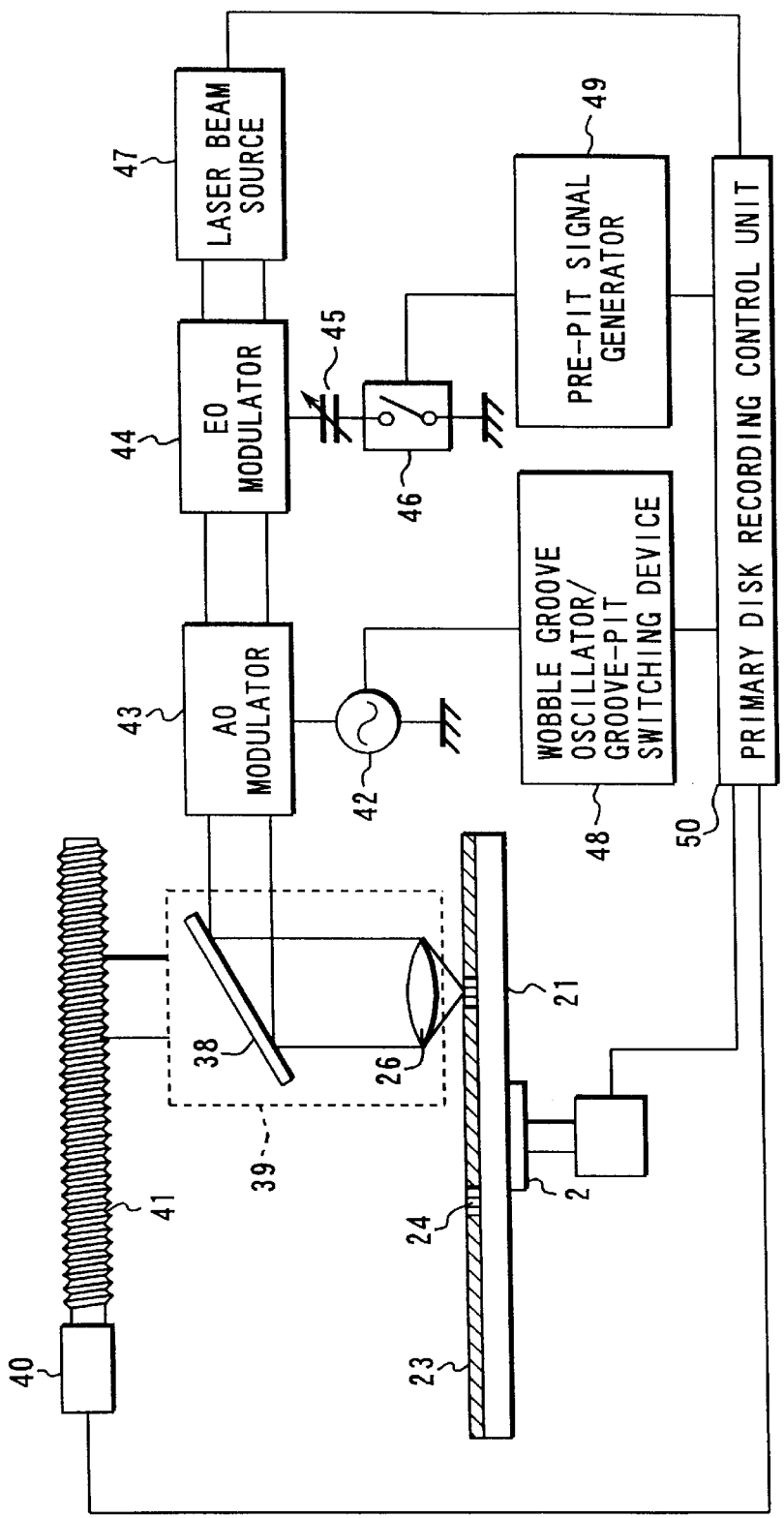
FIG. 6 is an example of a primary disk manufacturing apparatus for use in the steps of manufacturing a primary disk as shown in FIGS. 4A to 4E and FIGS. 5A to 5F.

FIG. 6 shows the structure of the primary disk recording apparatus for locally exposing the photoresist layer 23, as shown in FIG. 4C.

As has been described above, the glass plate 21 is rotated for a specific number of rotations on the spindle motor 22.

The laser beam 25 is reflected by a deflecting mirror 38 and converged on the photoresist layer 23 by the objective lens 26. The deflecting mirror 38 and objective lens 26 are a movable unit 39, and move as one body in the radial direction of the glass plate 21.

The movable unit 39 is moved by a feed motor 40 and a feed gear 41. The movable unit 39 has a monitor portion (not shown) for optically monitoring a converged beam spot on the glass plate 21. A primary disk recording control unit 50 controls the number of rotations of the spindle motor 22 in accordance with a monitor output so that the movement speed (linear speed) of the converged beam spot relative to the glass plate 21 is always unchanged.

The laser beam 25 emitted from a laser beam source 47 reaches the deflecting mirror 38 through an EO (electro-optical) modulator 44 and an AO (acousto-optical) modulator 43.

A high-speed switch 46 is turned on/off by a pre-pit signal representing a fine projection-and-recess pattern, which is generated from a pre-pit signal generator 49, and a voltage from a variable voltage generator 45 is applied and not applied to the EO modulator 44.

If the voltage applied to the EO modulator 44 is varied, the amount of the laser beam which has passed through the EO modulator 44 varies.

The amount of the laser beam reaching the photoresist layer 23 is thus varied, and the exposed portions 24 and non-exposed portions are formed on the photoresist layer 23.

On the other hand, a voltage of a specific frequency is applied from a specific frequency oscillator 42 to the AO modulator 43. As a result, standing waves (inter-modular compression waves in the AO modulator 43) having a specific distance cycle occur in the AO modulator 43. The laser beam is Bragg-reflected by the standing waves and deflected in a specific direction.

Accordingly, the distance cycle of the standing waves varies and the Bragg conditions vary. Thus, the angle of the laser beam 25 is changed. Specifically, the direction of propagation of the laser beam 25 varies by changing the output frequency of the specific frequency oscillator 42. As result, the converged beam spot on the photoresist layer 23 shifts in the radial direction.

In the case when an information storage medium has a pre-groove 1 that wobbles at a predetermined cycle, the frequency of the specific frequency oscillator 42 varies at the predetermined cycle in accordance with an output from a wobble groove generator/wobble pit switching device 48. In the case of a wobble pit, the frequency of the specific frequency oscillator 42 is varied so that the converged beam spot is displaced in the radial direction on the photoresist layer 23 by half the track pitch (land-groove pitch).

Figure 3:
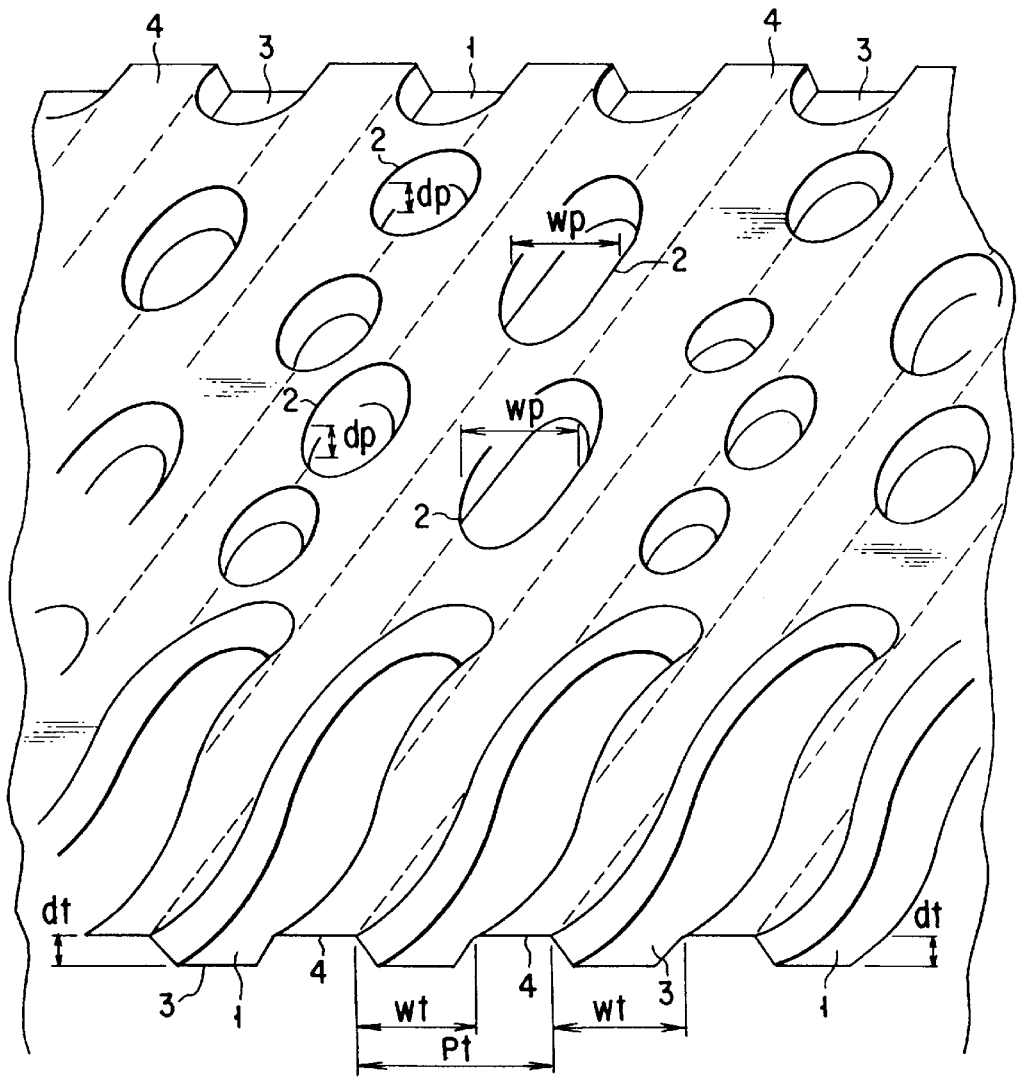
FIG. 3 is a partially enlarged view of a recording surface of an information storage medium according to an embodiment of present invention.

FIG. 3 shows the structure of the recording film 34, 36 formed through the above-described steps. The dimensions of respective portions shown in FIG. 3 are all values on the recording film 34, 36. Taking into consideration a decrease in transfer efficiency at the time of forming the pre-groove and pre-pit replica through the steps shown in FIGS. 5A to 5F, the depth and width on the primary disk 51 are optimally varied.

As is shown in FIG. 3, the pre-groove 1 cut intermittently by sectors. Pre-pits 2 are formed on sector portions between the pre-grooves 1.

A flat portion of the pre-groove 1, which is located between groove portions 3, is called a land portion 4.

When the information storage medium shown in FIG. 3 is formed, a recording method called a land/groove recording method is adopted. Although not shown, writable or rewritable record marks are formed in the groove portion 3 and on land portion 4.

The pre-groove 1 wobbles in a small range of amplitude, as shown in FIG. 3,

1] in order to be used for rotational synchronism of the motor for rotating the information storage medium, and 2] to obtain sync signals for reproducing and recording information from the information storage medium.

A principle for detecting a tracking error by using the pre-groove 1 will now be described with reference to FIGS. 8A to 8C.

Figure 8A:
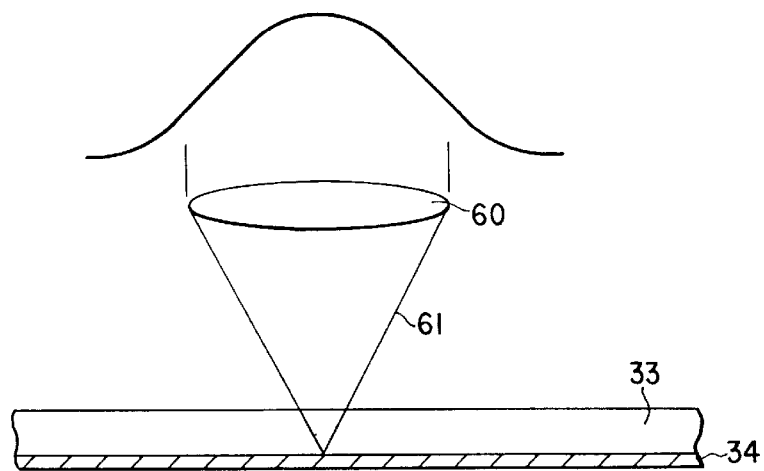
FIGS. 8A to 8C are schematic views for describing an intensity distribution of a laser beam reflected from the recording surface shown in FIG. 3.

In many cases, the intensity distribution of a laser beam 61, before it is made incident on an objective lens from a light source (not shown), is a Gauss distribution, as shown in FIG. 8A.

When the recording film 34 is flat and has no pre-groove, the laser beam 61 is reflected by the recording film 34 of the information storage medium and passes back through the objective lens 60. In this case, the intensity distribution of the laser beam 61 is almost similar to the intensity distribution before incidence.

Figure 8B:
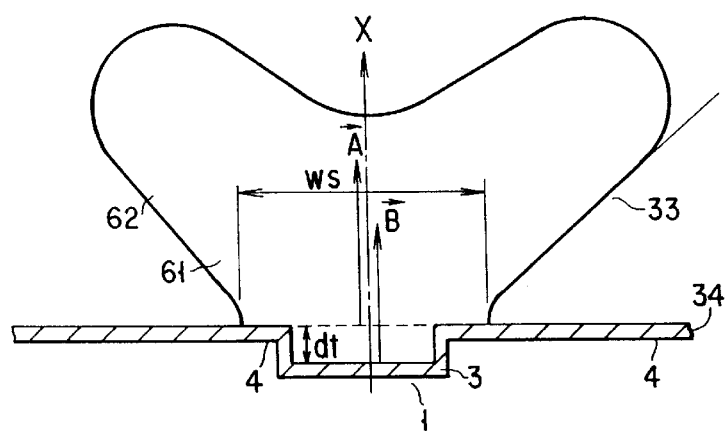

A description of when the center of the laser beam 61 coincides with the center of the groove portion 3 of the pre-groove 1, as shown in FIG. 8B.

The sum of the amplitude of the light reflected by the land portion 4 is expressed by A. For the purpose of simplicity in calculations, the reflection light from all land portions 4 is represented by imaginary reflection light Ar from a position of center of gravity of the land portions 4. Consider the system the center of laser beam 61 coincides with the center of groove portion 3, and thus, the reflection light Ar agrees with the center of optical axis.

$$Ar = A\exp(ikx) \tag{1}$$

wherein $$k = 2\pi/\lambda_N \tag{2}$$

$\lambda_N$ represents the wavelength of laser beam 61 passing through the plastic base plate 33 and has the following relationship with the wavelength $\lambda$ of laser beam 61 in a vacuum and the refractive index n of the plastic base plate 33:

$$\lambda_N = \lambda/n \tag{3}$$

The sum of amplitude of light reflected by the groove portion 3 is expressed by B.

For the purpose in simplicity of calculations, the reflected light from all groove portions 3 is represented by reflected light Br from a position of center of gravity of the groove portions 3. Because of symmetry of the system, Br agrees with the center of the optical axis.

Since the reflected light Br reflected toward the center of optical axis of the objective lens 60 has a phase delay relative to Ar by an amount corresponding to a double-path amount of the depth dt of the pre-groove 1, Br is expressed by $$Br = B\exp(ikx + ik2dt) \quad (4)$$

If the condition for standardization is set by $$A + B = 1 \quad (5)$$

equation (1) is modified as follows:

$$Ar = (1-B) \exp(ikx) \quad (6)$$

Accordingly, the sum of the complex amplitude of the reflected light is given by $$\phi = \exp(ikx) + B\exp(ikx + ikt)\{\exp(ikdt) - \exp(-ikdt)\} \quad (7)$$
$$= \exp(ikx) + i2B\sin(kdt)\exp(ikx + ikdt)$$
$$= \exp(ikx)\{1 + i2B\sin(kdt)\exp(ikdt)\}$$

If equation (7) is used, the reflected light intensity is converted to $$|\phi|^2 = 1 + i2B\sin(kdt)\{\exp(ikdt) - \exp(-ikdt)\} + \quad (8)$$
$$4B2\sin^2(kdt)$$
$$= 1 - 4B\sin^2(kdt) + 4B2\sin^2(kdt)$$
$$= 1 - \{1 - 4(B - 1/2)^2\}\sin^2(kdt)$$

Equation (8) signifies:

i] When B=0 (groove width Wt=0, or with no groove), $|\phi|^2=1$, and 100% of the light returns with no interference.

ii] When B=1 (groove width Wt being greater than converged beam spot size Ws), $|\phi|^2=1$, and 100% of the light returns with no interference, like item [i].

iii] When A=B=½ (the sum of the amplitude of the reflected light from the groove portions 3 coinciding with that the of amplitude of the reflected light from the land portions 4), $|\phi|^2$ takes a minimum value, 1−sin² (kdt).

In other words, in case [iii], maximum interference occurs and the amount of reflected light decreases to a lowest level (i.e. a large modulation degree of reproduction signal is obtained).

iv] When kdt=mπ (m: an integer), $|\phi|^2=1$, and 100% of the light returns with no interference.

v] When kdt=(m+½)π(m: an integer (including zero or a negative value), $|\phi|^2$ takes a minimum value, 1−{1−4 (B−½)²}.

Specifically, in case [v], like case [iii], maximum interference occurs and the amount of reflected light decreases to a lowest level (i.e. a large modulation degree of reproduction signal is obtained).

Figure 8C:
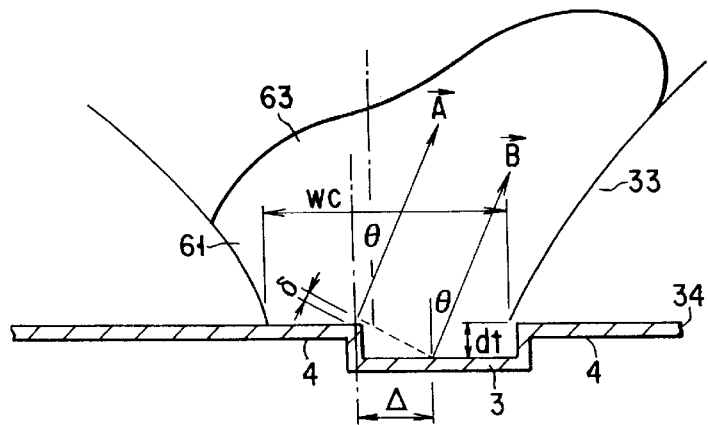

An analysis will now be made of a diffracted light amplitude distribution where a converged beam spot center departs from the center of the groove portion 3 and the diffracted light is at a angle θ from the optical axis, as shown in FIG. 8C.

Suppose that the sum the of amplitude of the reflected light from the groove portion 3 is B, the sum of the amplitude of reflected light from the land portion 4 is A, a distance between the center of gravity of reflected light from the groove portion 3 and an imaginary center of gravity of reflected light from the land portion 4 is Δ, and a level difference between the groove portion 3 and land portion 4 is dt.

As is shown in FIG. 8C, if an optical path difference between two reflected waves is expressed by δ and the optical path difference dt before reflection is considered, a phase error between the two waves reflected in θ direction is given by dt−δ

Figure 9:
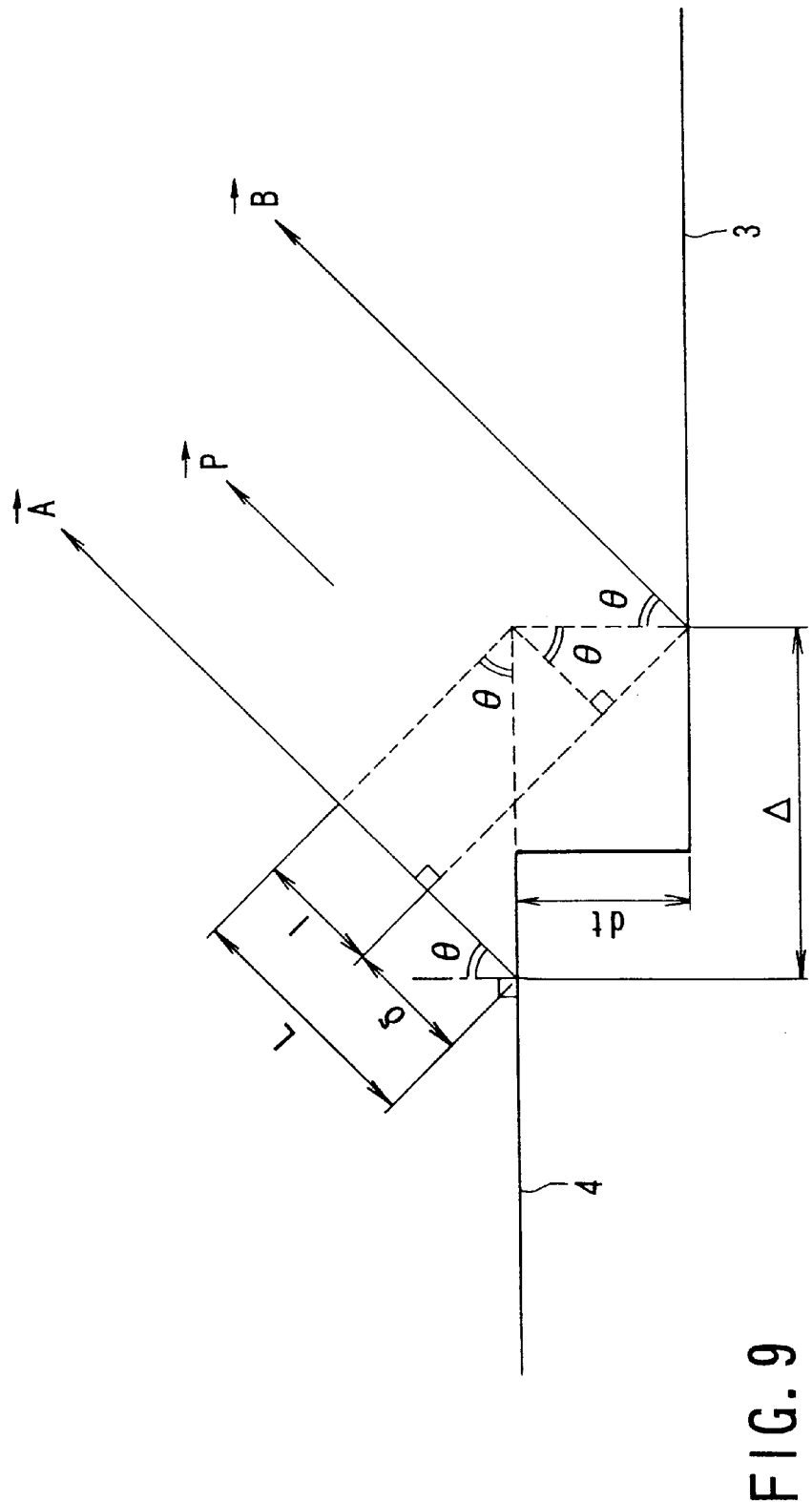
FIG. 9 is a schematic view for calculating an optical path difference of the laser beam shown in FIG. 8C.

From FIG. 9, $$L = \Delta\sin\theta, \quad 1 = dt\cos\theta$$

Thus, $$\delta = L - 1 = \Delta\sin\theta - dt\cos\theta$$

Accordingly, the phase error between the two waves reflected in θ direction is given by $$dt - \delta = dt(1 + \cos\theta) - \Delta\sin\theta \quad (9)$$
$$= 2dt(\cos^2\theta/2) - 2\Delta\sin(\theta/2)\cos(\theta/2)$$
$$= 2\cos(\theta/2)\{dt\cos(\theta/2) - \Delta\sin(\theta/2)\}$$

In particular, when θ is sufficiently small, approximation is made as follows:

$$\cos(\theta/2) \approx 1, \sin(\theta/2) \approx \theta/2$$

Thus, equation (9) can be approximated as follows:

$$dt - \delta \approx 2dt - \Delta\theta \quad (10)$$

In association with equation (1), the complex amplitude of light reflected by the land portion 4 and propagating in the θ direction is given by $$Ar = A\exp(ikr) \quad (11)$$

In association with equation (4), the complex amplitude of light reflected by the groove 3 and propagating in the θ direction is given from equation (10) by $$Br = B\exp(ikr + ik2dt - ik\Delta\theta) \quad (12)$$

Accordingly, as to the total complex amplitude of light propagating in the θ direction, the following modification is made in equation (7):

$$2dt \rightarrow 2dt - \Delta\theta$$

and the following equation (13) is obtained:

$$\phi = Ar + Br \quad (13)$$
$$= \exp(ikx)\{1 + i2B\sin(kdt - k\Delta\theta/2)\exp(ikdt - k\Delta\theta/2)\}$$

Furthermore, as to the total amount of light propagating in the θ direction, the following modification is made in equation (8):

$$2dt \rightarrow 2dt - \Delta\theta$$

and the following equation (13) is obtained:

$$|\phi|^2 = 1 - \{1 - 4(B - 1/2)^2\}\sin^2(kdt - k\Delta\theta/2) \quad (14)$$
$$= 1 - \{1 - 4(B - 1/2)^2\} \times$$
$$\{\sin(kdt)\cos(k\Delta\theta/2) - \cos(kdt)\sin(k\Delta\theta/2)\}^2$$

In this case, kΔθ/2 is regarded to be sufficiently small, and the following approximations are made:

$$\cos(k\Delta\theta/2) \approx 1,$$
$$\sin(k\Delta\theta/2) \approx k\Delta\theta/2, \text{ and}$$

$(k\Delta\theta/2)2\approx 0$

Thus, equation (14) can be modified as follows:

$$|\phi|^2 \approx 1 - \{1 - 4(B - 1/2)^2\}\{\sin(kdt) - (k\Delta\theta/2)\cos(kdt)\}^2 \quad (15)$$

$$\approx 1 - \{1 - 4(B - 1/2)^2\}\{\sin^2(kdt) - (k\Delta\theta)\sin(kdt)\cos(kdt)\}$$

$$\approx 1 - \{1 - 4(B - 1/2)^2\}\{\sin^2(kdt) - (k\Delta\theta/2)\sin(k2dt)\}$$

When $\Delta=0$ or when $\theta=0$, equation (15) agrees with equation (8).

The polarity in the term, $(k\Delta\theta/2)$ sin $(k2dt)$, in equation (15) is reversed depending on the polarity (positive or negative) of $\Delta$, and also the polarity in $(k\Delta\theta/2)$ sin $(k2dt)$ is reversed depending on the polarity (positive or negative) of $\theta$.

Accordingly, when a tracking error is detected by the push-pull method, light reflected by the recording film 34 is divided at wave front into two components, and a difference between the sum of light returning in the positive direction of $\theta$ and the sum of light returning in the negative direction of $\Delta$ is found to detect a variation amount of $\Delta$. The direction of the tracking error is detected by finding whether the value $\Delta$ takes a positive value or a negative value.

If the characteristics of the term of equation (15) including $(k\Delta\theta/2)\sin(k2dt)$ are analyzed, there are the following features:

vi] When B=0 (groove width Wt=0, or with no groove), $|\phi|^2=1$ at any point irrespective of $\theta$, and no tracking error is detected.

vii] When B=1 (groove width Wt being greater than converged beam spot size Ws), $|\phi|^2=1$ at any point irrespective of $\theta$, and no tracking error is detected.

viii] When A=B=½ (the sum of amplitude of reflection light from the groove portions 3 coinciding with that of amplitude of reflection light from the land portions 4), $|\phi|^2$ takes a maximum value in relation to $\theta$, $1-\{\sin^2(kdt)-(k\Delta\theta/2)\sin(k2dt)\}$.

In other words, in this case, maximum interference occurs and a tracking error detection signal increases to a maximum level.

ix] When k2dt=m$\pi$ (m: an integer), $(k\Delta\theta/2)$ sin $(k2dt)=0$ and no tracking error detection signal is obtained.

x] When k2dt=(m+½)$\pi$(m: an integer (including zero or a negative value)), $|(k\Delta\theta/2)\sin(k2dt)|$ takes a minimum value, $|k\Delta\theta/2|$, and a maximum tracking error detection signal is obtained.

Further consideration is given of the condition under which the maximum tracking error detection signal is obtained.

As mentioned above, the condition under which the maximum tracking error detection signal is obtained is $$k2dt=(m+\tfrac{1}{2})\pi \quad (16)$$

If equations (2) and (3) are substituted in equation (16), $dt=(m+\tfrac{1}{2})\pi\times(\lambda_N/2\pi)/2=\{\lambda/(8n)\}+\{(m\lambda)/(4n)\}$ (m: an integer including zero or a negative value) (17)

According to similar calculations, the condition under which no tracking error detection signal is obtained is $dt=(m\lambda/(4n)$ (m: an integer including zero or a negative value) (18)

Next, the condition for A=B is considered.

The diameter of a portion where the intensity of a converged spot center on the information storage medium is equal to $e^{-2}$ width is defined as converged spot size Ws. The amplitude distribution in a case where the converged beam spot amplitude distribution is approximated to Gauss distribution can be expressed by $$\phi(\rho)=\alpha\exp(-4\rho^2/Ws^2) \quad (19)$$

At this time, since the total amplitude value from the center to the radius, $\rho=\rho P$, is a definite integral value from $\rho=0$ of $\phi(\rho)$ to $\rho=\rho P$, the following equation is obtained from equation (19):

$$B=\int 2\pi\rho\phi(\rho)d\rho \quad (20)$$

If $$\tau=-4\rho^2/Ws^2 \quad (21)$$

the following equation is obtained:

$$d\tau=-(8\rho/Ws^2)d\rho \quad (22)$$

Accordingly, equation (20) is modified to $$B=(\alpha\pi Ws^2/4)\{1-\exp(-4\rho p^2/Ws^2)\} \quad (23)$$

If the condition for standardization is considered, $$\alpha=4/(\pi Ws^2) \quad (24)$$

Thus, from equations (23) and (24), the following equation is obtained:

$$B=1-\exp(-4\rho p^2/Ws^2) \quad (25)$$

From equation (25), the condition for B=½ is $$\rho p \approx 0.416 Ws \quad (26)$$

Accordingly, when a circular region such as pre-pit 2 is considered, if the diameter Wp thereof is $$Wp=2\rho p \approx 0.833 Ws \quad (27)$$

$B\approx\tfrac{1}{2}$, and a maximum detection signal is obtained under this condition.

The shortest pit shape of the pre-pit is a circular shape. Since the groove portion 3 has a stripe shape and extends linearly, it is narrower than the pre-groove width Wt (equation (27)) for the condition of $B\approx\tfrac{1}{2}$.

Accordingly, the condition for obtaining a maximum tracking error detection signal is $$Wt \leq 0.833 Ws \quad (28)$$

Suppose that the light source wavelength of the information reproducing apparatus is $\lambda$ and the numeral aperture of the objective lens 60 for converging the laser beam 61 on the information storage medium is NA. In this case, the converged spot size Ws, which is $e^{-2}$ width of the intensity of the converged beam spot center on the information storage medium at the time uniform-distribution light has been made incident on the objective lens 60, is given by $$Ws=0.82\lambda/NA \quad (29)$$

For example, when light source wavelength $\lambda=0.65$ $\mu$m and NA=0.60, $$Ws = 0.82 \times 0.65 / 0.60 \quad (30)$$

$$= 0.89 \ \mu m$$

In fact, however, the intensity distribution of the laser beam 61 incident on the objective lens 60 is not uniform. In many cases, the intensity distribution has a Gauss distribution. As a result, the converged spot size Ws on the recording film 34 is slightly greater than the above value (about 3 to 20%).

The necessary dimensions of the pre-groove 1 will now be explained by using the above-described formulae.

In order to obtain a tracking error detection signal, it is necessary, from formula (15) and item [vi], the width Wt of the groove portion 3 needs to be less than the converged spot size Ws. Accordingly, when the example of equation (30) is used, the condition, Wt<0.89 $\mu$m needs to be satisfied.

From formula (28), a maximum tracking error detection signal is obtained when Wt≈0.833 Ws (wt≈0.74 $\mu$m in the example of equation (30)) or slightly less.

As regards the depth of the pre-groove 1 (or the height of the stepped portion of the projecting portion defining the pre-groove), in order to obtain a tracking error detection signal, it is necessary, from equation (18), to avoid the condition:

$$dt = (m\lambda)/(4n)$$

The information reproducing apparatus can perform tracking error correction if the following formula is satisfied in formula (15):

$$|\sin(k2dt)| > 0.1 \quad (31)$$

The condition for satisfying equation (31) is given by $$m\pi + \pi/31 \leq k2dt \leq (m+1)\pi - \pi/31 \quad (32)$$

Formula (32) may be developed to $$m\lambda/(4n) + \lambda/(124n) \leq dt \leq m\lambda/(4n) + (15\lambda)/(62n) \quad (m: \text{an integer}) \quad (33)$$

Accordingly, it is necessary to satisfy formula (33) as an essential condition for the stepped portion of the pre-groove 1.

Although the condition under which the tracking error detection signal becomes maximum is given by equation (17), the depth is set to be greater (or the size of the stepped portion is made larger) than the condition of equation (17) in connection with the information storage medium of the present invention wherein the land/groove recording is performed.

Figure 7:
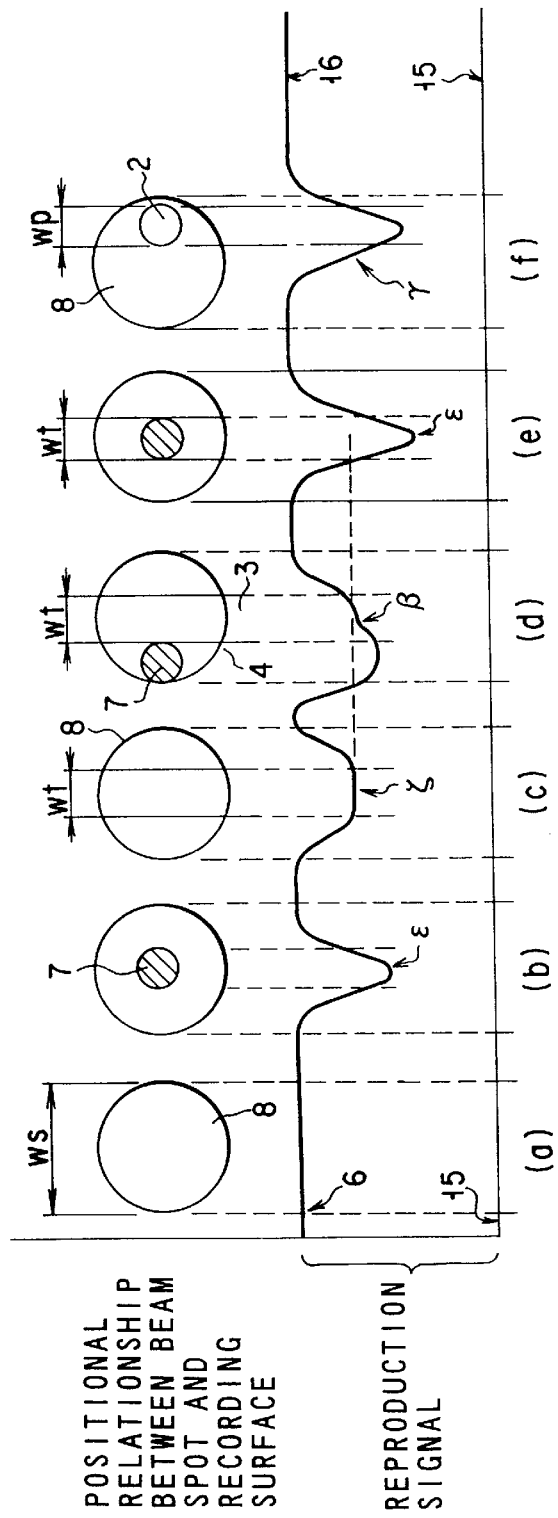
FIG. 7 is a schematic view which describes the level of a reproduction signal obtained by tracing the recording surface shown in FIG. 3.

With reference to FIG. 7, a method for forming a record mark 7 on the information storage medium by land/groove recording will now be described.

As shown in portion (a) of FIG. 7, a beam spot 8 of a reproducing laser beam with a spot size Ws is radiated on a mirror-surface portion of the recording film 34. The sum of the laser beam 61 totally reflected by the mirror-surface portion and returned to the objective lens 60 is expressed by 100% reflectance level 16. The reproduction signal detection level when no beam is reflected is expressed by reflectance 0-level 15.

The optical characteristics, magnetic characteristics or shape of the recording film 34 is varied by radiation of a large quantity of laser beam 61, thereby forming a write-once or rewritable record mark 7.

Alternatively, a phase-variable film is used as the recording film 34, and the phase of a local portion is changed to amorphous phase, compared to crystal phase of a surrounding portion, thereby forming a record mark 7. Basically, a signal is reproduced by detecting a variation in amount of a reproduction signal due to the presence/absence of record mark 7.

The optical reflectance within the record mark 7 is about half that in the peripheral crystalline region. When there is a positional relationship between the reproducing spot 8 and record mark 7, as shown in portion (b) of FIG. 7, the reproduction signal amount decreases to point $\epsilon$.

When the reproducing spot 8 traces the pre-groove 1 with the width Wt, as shown in portion (c) of FIG. 7, the reproduction signal decreases to point $\zeta$, as explained in connection with formula (1). As is clear from FIG. 8B, the reproduction signal decreases to point $\zeta$ since reflection light Ar from the land portion 4 and reflected light Br from the groove portion 3 interfere with each other and cancel each other in accordance with a phase difference therebetween. In this case, for example, if the reflected light amplitude A of the reflected light Ar from the land portion 4 is decreased while the reflected light amplitude B from the groove portion 3 is kept constant, the amount of interference decreases and the canceling effect reduces.

Specifically, if the record mark 7 is located on the land portion 4, as shown in portion (d) of FIG. 7, the reflected light amplitude A from the land portion 4 is decreased. As a result, the amount interference between the reflected light Ar from the land portion 4 and the reflected light Br from the groove portion 3 can be decreased and the mutual cancellation effect also decreased.

This means that if the reflectance of the record mark 7 and the shape of the pre-groove 1 are optimized and the reproduction signal amount (point $\beta$) shown in portion (d) of FIG. 7 is made to coincide with the reproduction signal amount (point $\zeta$) shown in portion (c) of FIG. 7, the reproduction signal amount can be made substantially constant, i.e. $\zeta \approx \beta$, irrespective of the presence/absence of the record mark 7 on the land portion 4.

As stated above, if good use is made of the interference effect, the record mark 7 recorded at the groove portion 3 can be stably reproduced without influence of crosstalk, for example, even if the record mark on the adjacent track (the land portion 4 in portion (d) of FIG. 7) enters the reproducing spot 8.

As is understood from the above description, the following conditions (I) and (II) are required to reduce crosstalk from an adjacent track in the land/groove recording.

I) The reflection variation of the recording mark 7 itself is small.

If a recording film 34 of the type wherein a hole is formed in the recording film 34 at the time of write-once recording is used, reflection light from the hole decreases greatly. As a result, the degree of decrease in amount of light from the record mark 7 is much greater than the effect of decreasing the interference between the land portion 4 and groove portion 3 and raising the level of point $\zeta$ in portion (c) of FIG. 7.

II) The reflection light level (signal level at point $\zeta$ in portion (c) of FIG. 7) of light from the pre-groove 1 is lower by a predetermined degree or more.

Even if the record mark 7 is located on the land portion 4 and the reflection light amplitude value A of light from the land portion is decreased, as shown in portion (d) of FIG. 7, the level variation in reproduction signal amount is small if the signal level at point $\zeta$ in portion (c) of FIG. 7 is high from the beginning. Due to influence of the decrease in reflectance by the record mark 7 as a single unit, the total reproduction signal level decreases.

In order to satisfy the condition (II), the stepped portion of the pre-groove 1 is optimized in the present invention.

Specifically, the condition for obtaining the maximum tracking error detection signal is expressed by formula (27). If the condition of formula (27) is substituted in equation (18), $\sin^2(kdt)=0.5$ and the condition B is not satisfied.

According to results of experiments and computer simulations, it is understood that the following condition is necessary to satisfy the condition (II):

$$\sin^2(kdt) > 0.5 \tag{34}$$

Since $m\pi+\pi/2-\pi/4 < kdt < m\pi+\pi/2+\pi/4$, the condition for satisfying formula (34) is given by $$m\lambda/(2n)+\lambda/(8n) < dt < m\lambda/(2n)+3\lambda/(8n) \tag{35}$$

(m: an integer; n: refractive index of plastic base plate)

Using formula (28), the width of the groove portion 3 is set at $Wt \approx 0.833\ Ws$.

In a case where a phase variation film of GeSnTe is used as the recording film 34, the reflectance (reproduction signal level at point $\epsilon$ in portion (b) of FIG. 7) of light from the record mark 7 is about 50%. Compared to this condition, the dimension of the stepped portion (depth) of the pre-groove 1 most suitable for the land/groove recording is $dt \approx \lambda/(5n)$ as a result of computer simulation.

Figure 1:
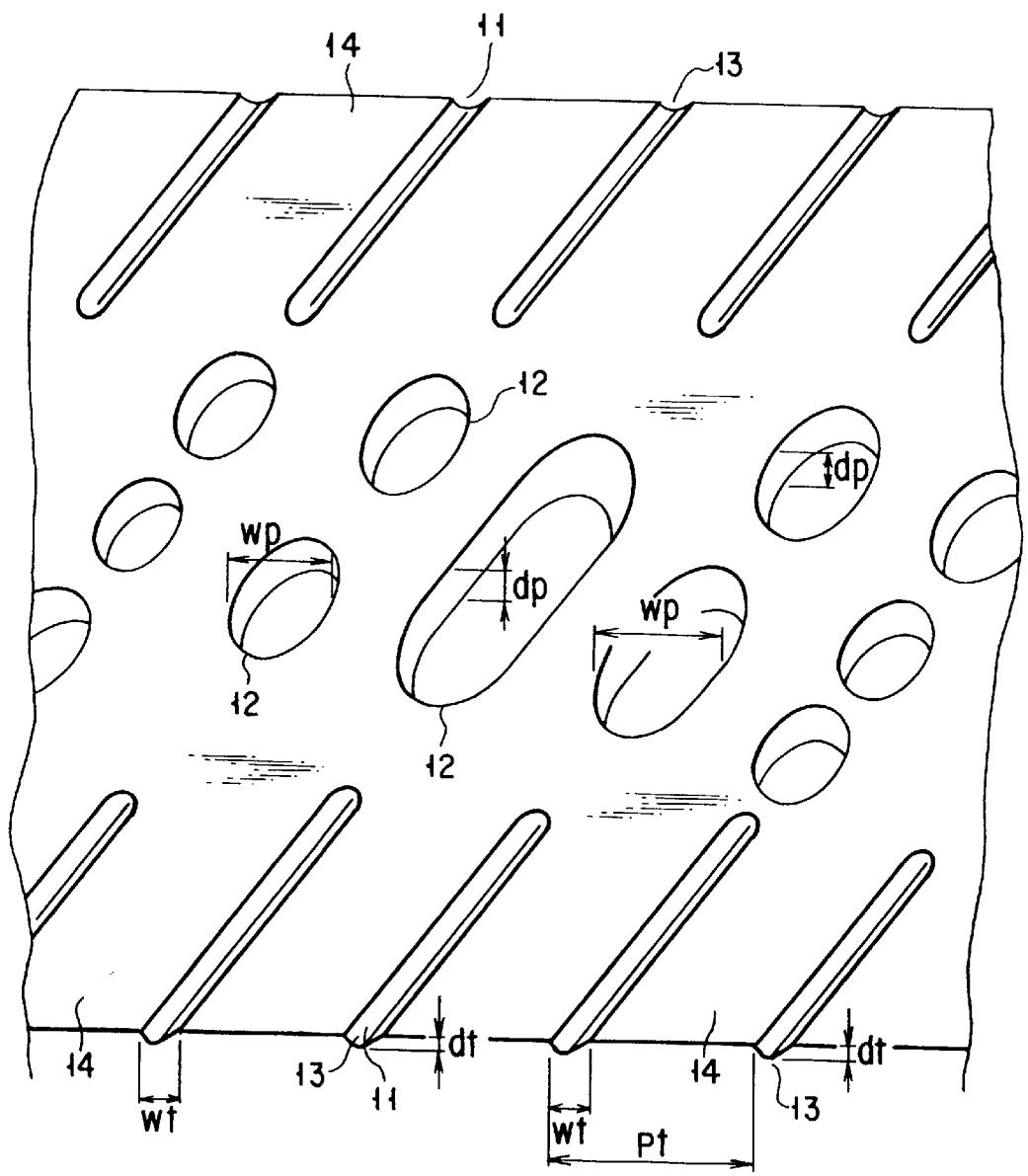

In mentioned above, the photoresist layer 23 needs to comprise a single layer by reasons of manufacture. Because of this, the exposure amount of laser beam 25 on the photoresist layer 23 is controlled to form the shallow groove portion 13 with depth dt, as shown in FIG. 1. However, as mentioned above, the depth dt of the groove portion 13 varies greatly due to a slight change of the manufacturing conditions.

By contrast, according to the recording method for the information storage medium of the present invention, the depth and width of the pre-groove 1 and pre-pit 2 can be made substantially equal. Accordingly, the same conditions for exposure on the photoresist layer 23 can be adopted for the pre-groove 1 and pre-pit 2, and the manufacture is conducted easily and stably.

Record marks 7 are formed on both the land portion 4 and groove portion 3 of the pre-groove 1. If the pre-pits 2 are provided on both extensions of the land portion 4 and groove portion 3, the pre-pits 2 between adjacent tracks are located close to each other. Consequently, if the information of pre-pit 2 is reproduced, crosstalk of the pre-pit 2 on the adjacent track will occur.

To solve this problem, as shown in FIG. 3, the pre-pits 2 are displaced by Pt/4 from the center of the groove portion 3 or land portion 4 in the transverse direction (i.e., perpendicular to the direction of tracing of the reproducing spot).

Accordingly, even when the reproducing beam spot 8 is tracing the groove portion 3, the spot 8 passes over the pre-pit 2 at a position slightly departing from the center of the spot 8, as shown in portion (f) of FIG. 7. Thus, a sufficiently large detection signal can be obtained from the pre-pit 2.

Similarly, when the reproducing beam spot 8 is tracing the land portion 4, the spot 8 passes over the pre-pit 2 at a position slightly departing from the center of the spot 8. Thus, a sufficiently large detection signal can be obtained from the pre-pit 2.

A method of forming the pre-pit 2 shown in FIG. 3 will now be described in brief with reference to FIG. 6.

When the pre-groove 1 is formed, the high-speed switch 46 remains turned on, and the laser beam 25 from the laser light source 47 passes through the EO modulator 44 without decreasing the light amount.

In order to form the pre-groove 1, the voltage of an output from the wobble groove oscillator/groove-pit switching device 48 varies at a fixed cycle and at a fixed amplitude. In accordance with the varying voltage, the output frequency of the specific frequency oscillator 42 varies.

In accordance with the variation in frequency, the direction of the laser beam 25 passing through the AO modulator 43 is slightly altered. Thus, as shown in FIG. 3, the pre-groove 1 is recorded while wobbling in a small range of amplitude.

If the position of the laser beam 25 shifts from the pre-groove 1 to the formation region of the pre-pit 2, the output voltage of the wobble groove oscillator/groove-pit switching device 48 varies greatly, and the output frequency of the specific frequency oscillator 42 is varied. As a result, the amount of deflection of the laser beam 25 which has passed through the AO modulator 43 varies, and the converged beam spot is radially moved on the photoresist layer 23 by a degree corresponding to half the distance between the groove portion 3 and land portion 4.

The pre-pits 2 have projections and recesses intermittently, as shown in FIG. 3. In accordance with the shape of the pre-pits 2, ON/OFF signals are generated from the pre-pit signal generator 49 to drive the high-speed switch 46. Thus, the amount of laser beam 25 passing through the EO modulator 44 is switched.

It is clear, from the above description, that if the shape of the pre-groove 1 is set to an optimal one for land/groove recording, a reproduction signal amplitude (a difference between a signal level at point $\zeta$ in FIG. 7 and a 100% reflectance level 16) due to the presence/absence of the pre-groove 1 is almost similar to a reproduction signal amplitude (a difference between the signal level at point $\zeta$ in FIG. 7 and a signal level at point $\zeta$) due to the presence/absence of the record mark 7 on the pre-groove 1 or land portion 3.

If the depth dt of the pre-groove 1 is made substantially equal to the depth dp of the pre-pit 2 and the width Wt of the pre-groove 1 is made equal to the width Wp of the pre-pit 2, a reproduction signal amplitude associated with the pre-pit 2 due to the presence/absence of the pre-pit 1 is made similar to a reproduction signal amplitude due to the presence/absence of the pre-groove 1. Thereby, the same preamplifiers and same digitizing circuits can be used in the information reproducing apparatus.

Figure 10:
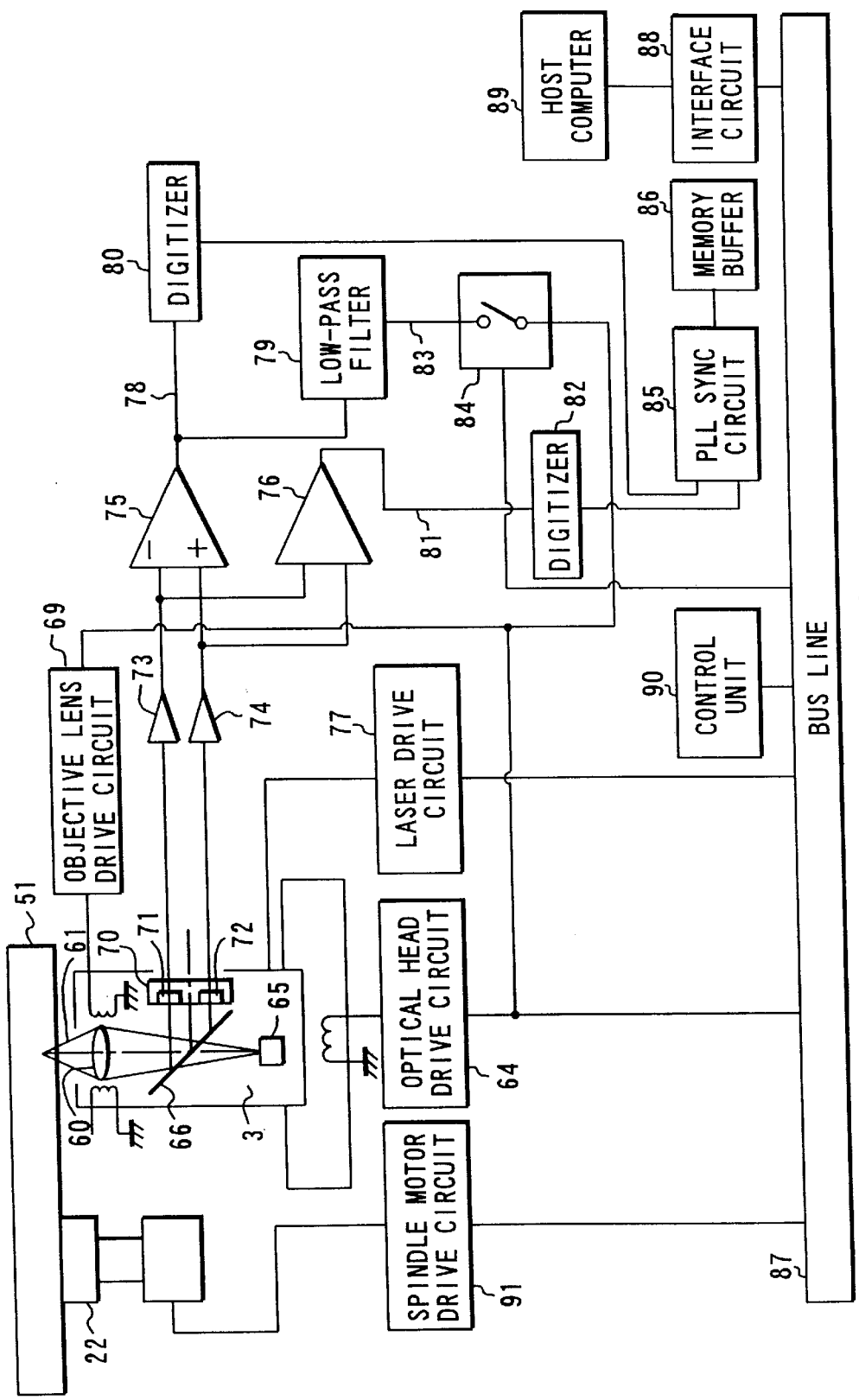
FIG. 10 is a schematic block diagram showing an information reproducing apparatus suitable for the information storage medium shown in FIG. 3.

FIG. 10 schematically shows an example of the structure of the information reproducing apparatus suitable for the above-described information storage medium.

The information storage medium 51 having the structure shown in FIG. 5F is rotated at a predetermined speed by a spindle motor 22.

The number of rotations of the spindle motor 22 is properly controlled by a spindle motor drive circuit 91 connected to a control unit 90 over a bus line 87. An optical head 63 is moved in the radial direction of the information storage medium 51 by an optical head drive circuit 64 connected to the bus line 87.

The amount of light emitted by a laser beam source 65 disposed in the optical head 63 is controlled by a laser beam drive circuit 77 so that a laser beam of a predetermined intensity is produced.

A laser beam 61 emitted from the laser beam source 65 passes through a half mirror 66 and is converged on the information storage medium 51 by an objective lens 60.

The laser beam 61 reflected by the information storage medium 51 and let to pass through the objective lens 60 once again is reflected by the half mirror 66 and guided to an optical detector 70.

The optical detector 70 has a first optical detection portion 71 and a second optical detection portion 72 and divides the laser beam 68 reflected by the information storage medium 51 into two components at wave front with respect to a straight line including the center axis of the beam. The divided components are detected by the first and second optical detection portions 71 and 72, respectively.

Signals obtained by the optical detection portions 71 and 72 are current/voltage converted by preamplifiers 73 and 74.

Signals obtained by the preamplifiers 73 and 74 are added by an adder 76 and the added signal is used as a reproduction signal 81 from the record mark 7. In addition, the signals obtained by the preamplifiers 73 and 74 are differentiated by a differential circuit 75, and an output from the differential circuit 75 is used as a reproduction signal 78 from the pre-pit 2.

The reproduction signal 81 from the record mark 7 and the reproduction signal 78 from the pre-pit 2 are digitized by digitizing circuits 82 and 80, respectively, and delivered to a PLL sync circuit 85. An output from the PLL sync circuit 85 is stored in a memory buffer 86 as a reproduction digital signal. The reproduction digital signal is then output to a host 89 via an interface 88 over the bus line 87, upon request by the host 89 side.

Portion of the reproduction signal 78 from the pre-pit 2 is passed through a low-pass filter 79 and used as a tracking error detection signal 83.

Specifically, the portion of the reproduction signal 78 is passed through a switching circuit 84 by control of the control unit 90 and delivered to the objective lens drive circuit 69 to move the objective lens 61 in a desired direction.

In addition, portion of the tracking error detection signal 83 is supplied to the optical head drive circuit 64 to move the optical head 63 in a radial direction of the information storage medium 51.

According to the information reproducing apparatus shown in FIG. 10, the same preamplifiers 98 and same digitizing circuits 99 can be used for the record mark 7 and pre-pit 2. As a result, compared to the conventional reproducing apparatus shown in FIG. 2, the circuit configuration can be greatly simplified, and the manufacturing cost can be reduced.

Figure 2:
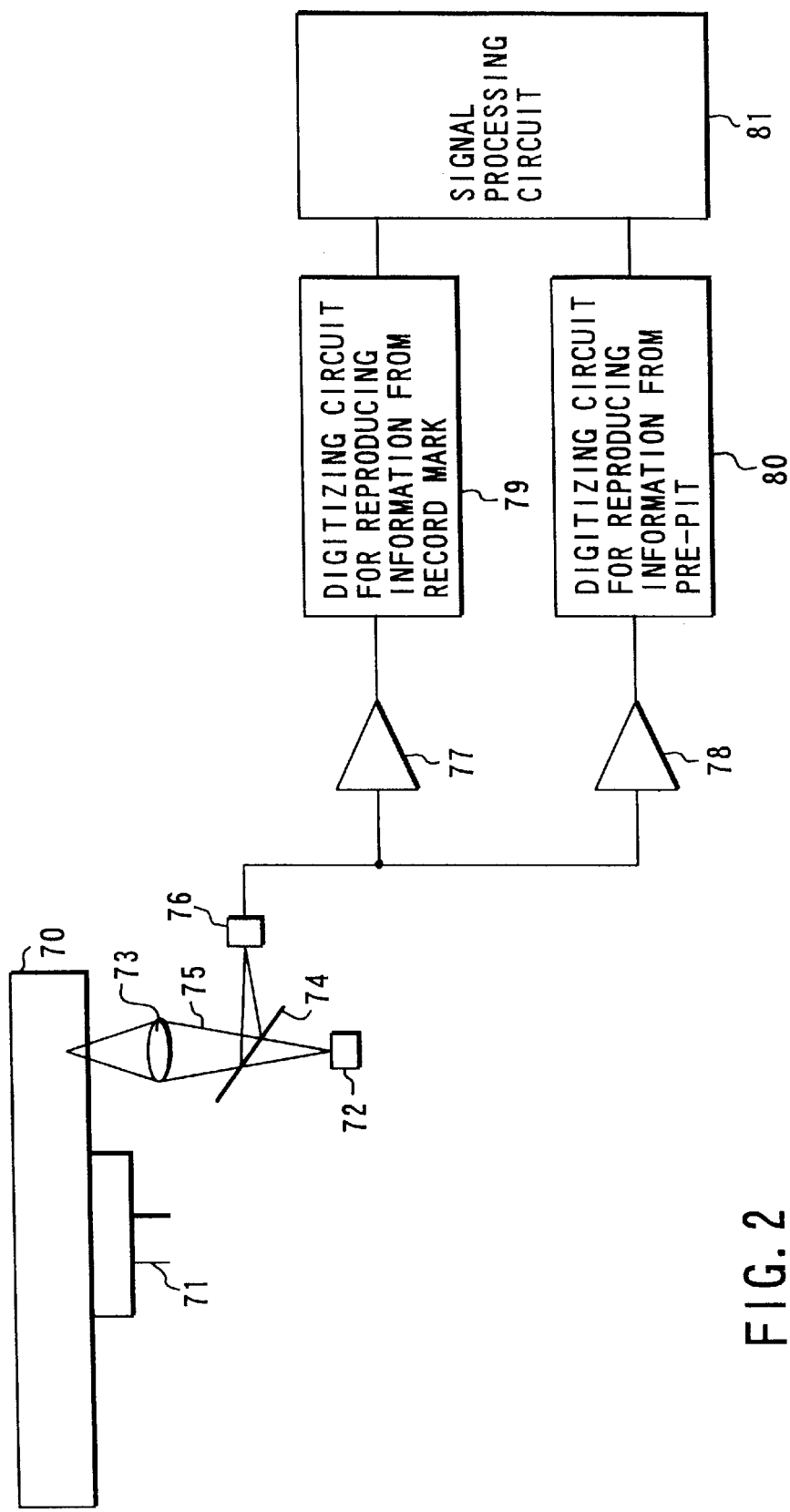

Specifically, in the information processing apparatus shown in FIG. 2, a reproduction signal amplitude obtained from the pre-pit 12 (see FIG. 1) differs greatly from a reproduction signal amplitude obtained from the record mark 7, and there is a need to provide preamplifiers 77 and 78 and digitizing circuits 79 and 80 for the respective signals. Compared to the information reproducing apparatus of the invention shown in FIG. 10, the circuit configuration of the conventional apparatus is more complex.

Figure 11:
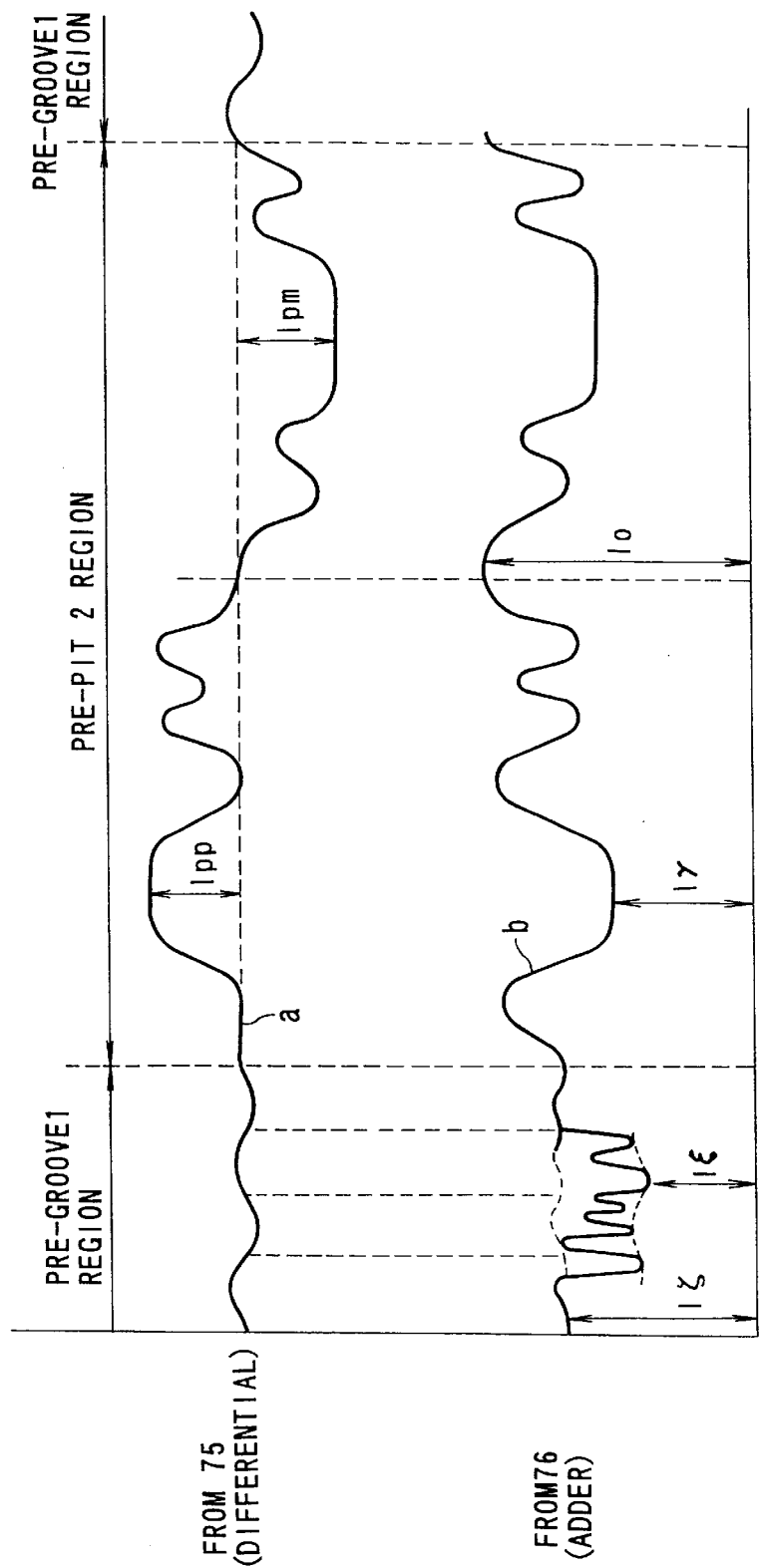
FIG. 11 is a schematic diagram showing a reproduction signal obtained by the information reproducing apparatus shown in FIG. 10.

FIG. 11 shows a reproduction signal obtained from the information storage medium 51 having the structure shown in FIG. 3 by using the information reproducing apparatus shown in FIG. 10. The curve a in FIG. 11 indicates an output signal from the differential circuit 75, and the curve b in FIG. 11 indicates an output signal from the adder 76.

Since the pre-groove 1 of the information storage medium shown in FIG. 3 wobbles in a small range of width, the reproduction signals a and b fluctuate up and down, as shown in FIG. 11, in accordance with the wobbling of the pre-groove 1 while the reproducing beam spot is tracing the groove portion 3 of the pregroove 1.

A signal level at the time no light is returned from the information storage medium 51 is used as a reference level.

A signal amount between the reference level and a maximum amplitude value associated with the groove portion 3 or land portion 4 is indicated by $I\zeta$ of the signal b. In the case where the record mark 7 is formed on the groove portion 3 or land portion 4, a signal amount between the reference level at which no light is returned and a minimum signal level associated with the record mark 7 is indicated by $I\xi$ of the signal b. The signal amount $I\zeta$ corresponds to the signal level at point $\zeta$ in portion (c) of FIG. 7, and the signal amount $I\xi$ corresponds to the signal level at point $\xi$ in portion (e) of FIG. 7.

When the converged beam spot is to trace the region of the pre-pit 2, the spot traces a position displaced from the center of the pre-pit 2 by Pt/4, since the center of the pre-pit 2 is displaced from the center of the groove portion 3 or land portion 4 by Pt/4, as mentioned above.

At this time, the output signal level of the adder 76 is $I\gamma$, as shown in signal level line b in FIG. 11. On the other hand, the signal level of the portion in the pre-pit region, where the pre-pit 2 is not provided, is Io. The level Io corresponds to the signal level at the position shown in portion (a) of FIG. 7.

The polarity of the output from the differential circuit 75 at the time the converged beam spot passes over the region of the pre-pit 2 changes, depending on whether the pre-pit 2 is located on the right side or left side of the tracing position of the converged beam spot. A plus-side signal amplitude of the output of the differential circuit 75 in the region of pre-pit 2 is indicated by Ipp, and a minus-side signal amplitude is by Imp.

Thus, a reproduction signal amplitude value relating to the region of the pre-pit portion 2 and a reproduction signal amplitude value relating to the record mark 7 on the pre-groove 1 or land portion 3 are substantially similar to each other.

The reproduction signal amplitude value relating to the region of pre-pit 2 is expressed by Io-$I\gamma$ in FIG. 11, and the reproduction signal amplitude value obtained from the record mark 7 on the pre-groove 1 or land portion 3 is expressed by $I\zeta$-$I\xi$ in FIG. 11.

In the present invention, target values Io-$I\zeta$ and $I\zeta$-$I\xi$ are Io-$I\gamma$≈$I\zeta$-$I\xi$.

For the purpose of confirmation, tests were conducted with respect to the reproduction of the above-described storage medium with use of the conventional reproducing apparatus shown in FIG. 2. It was found that in order to reproduce signals from both the record mark 7 and pre-pit 2 by the single adder 76, at least ten times the amplitude variation could be tolerated in consideration of the dynamic range of the adder 76.

The condition for the reproduction signal at this time is $$10 > (\text{Io}-I\gamma)/(I\zeta-I\xi) > 1/10$$

However, when up to ten times the amplitude variation is tolerated, influence of external noise is easily suffered, and sufficient stability is not attained.

According to further tests, it was found that four times the amplitude variation, preferably twice or less the amplitude variation, is indispensable to stably detect signals.

Therefore, the necessary conditions are:

$$4 > (\text{Io}-I\gamma)/(I\zeta-I\xi) > 1/4$$

or $$2 > (\text{Io}-I\gamma)/(I\zeta-I\xi) > 1/2$$

As has been described above, according to the present invention, the depth of the pre-groove can be set to be substantially equal to that of the pre-pit (dt≈dp). Thus, when the pre-groove and pre-format are formed on the photoresist layer 23, the photoresist layer can be exposed by a laser beam as deep as the glass plate 21 in the exposure step (FIG. 5C). Even if the exposure light amount varies slightly, the depth dt of the pre-groove or the depth dp of the pre-pit do not vary. If it is supposed that the transfer efficiency in each step is 100%, the depth dt of the pre-groove and the depth dp of the pre-pit can be controlled only by controlling the thickness dr of the photoresist layer 23. Thus, the management of the manufacturing steps is easy. Thereby, easy manufacture of information storage media with no variance is achieved, the manufacturing yield is increased, and the cost of the information storage medium is reduced.

Besides, according to the present invention, taking advantage of the features of the land/groove recording (the reflectance variation of light from the record mark being substantially equal to the that of light from the pre-groove), the depth of the pre-groove is made substantially equal to that of the pre-pit (dt≈dp). Thus, the reflectance variation of light from the pre-pit is made substantially equal to the that of light from the pre-groove, and thereby the reflectance variation of light from the pre-pit can be made substantially equal to the reflectance variation of light from the record mark on the pre-groove or land. Since the amplitude of the reproduction signal from the pre-pit and that of the reproduction signal from the record mark become similar to each other, information can be reproduced from the pre-pit and record mark by using the same circuit (with the same amplification gain of the reproduction signal). The structure of the reproducing circuit is simplified and the cost for manufacturing the information reproducing apparatus is reduced.

In this invention, the width of the pre-groove and the width of the pre-pit are made substantially equal to each other (Wt≈Wp). Thereby, the conditions for recording of the primary disk recording apparatus are stabilized, the productivity and reproducibility of information storage media are enhanced, and the cost of information storage media is reduced. Specifically, according to the method of forming the primary disk, the depth of the pre-groove/pre-pit can be controlled based on the thickness dr of the photoresist layer, and the width of the pre-groove can be controlled based on the exposure light amount on the photoresist layer. Therefore, the substantial equalization between the width of the pre-groove and the width of the pre-pit means equalization in exposure light amount between the pre-groove and the pre-pit.

Accordingly, when the primary disk of the information storage medium of this invention is manufactured, two-value exposure amounts including exposure amount "zero" may be used. When the primary disk is actually formed, it suffices that the AO modulator alters the exposure position, the voltage generated by the variable voltage generator is set to be constant in the EO modulator, and the high-speed switch merely performs ON/OFF operations. Thus, the exposure amount of light on the photoresist layer is stabilized, and the productivity and reproducibility are enhanced.

Moreover, the depth (level difference) and width of the pre-groove 1 and pre-pit 2 are substantially equalized, thereby facilitating and stabilizing the manufacture as well as increasing the manufacturing the yield. Thus, the unit cost of information storage media can be reduced. Specifically, if the pre-groove 1 and pre-pit 2 are equalized in depth (level difference), the depth (level difference) of the pre-groove 1 and pre-pit 2 can be controlled at the same time by controlling the thickness dr of the photoresist layer 23 shown in FIG. 5E. The information storage medium can thus be provided, wherein the exposure light amount on the photoresist layer 23 is controlled in two stages (ON/OFF) alone. Besides, the primary disk of the information storage medium can be easily manufactured, and thus a variance in characteristics among manufacturing lots is reduced to a minimum, the manufacturing yield is increased and the information storage medium is manufactured at low cost.

Furthermore, since the amplitude value of the reproduction signal obtained from the region of pre-pit 2 is substantially similar to the amplitude value of the reproduction signal obtained from the record mark 7 on the pre-groove 1 or land portion 3, the same pre-amplifier and digitizing circuit can be used. As a result, the circuit configuration is simplified, and the cost of the information reproducing apparatus is reduced. Even if the physical dimensions of the information storage medium vary slightly, a substantially constant detection signal amount is stably obtained and the information reproducing apparatus can be stably operated. In addition, since a detection signal matching with the signal detection method of the information reproducing apparatus is supplied, the signal detection of the information reproducing apparatus is stabilized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An information storage medium permitting reproduction of information with use of converged light, comprising:
   a pre-groove having a groove-like, continuous projection-and-recess shape, said pre-groove wobbling at a predetermined cycle; and
   a pre-pit formed of an intermittent recess/projection and having a depth substantially equal to a projection/recess of said pre-groove.

2. The information storage medium according to claim 1, wherein a width of said pre-pit is less than a spot size of said converged light used in information reproduction.

3. The information storage medium according to claim 1, wherein a width Wp of said pre-pit and a spot size Ws of said converged light used in information reproduction satisfy the following:

$$Wp=0.833\ Ws.$$

4. The information storage medium according to claim 1, wherein a width Wp of said pre-pit and a spot size Ws of said converged light used in information reproduction satisfy the following:

$$Wp<0.833\ Ws.$$

5. The information storage medium according to claim 2, wherein a width Wp of aid pre-pit and a spot size Ws of said converged light used in information reproduction satisfy the following:

$$Wp=0.833\ Ws.$$

6. The information storage medium according to claim 2, wherein a width Wp of said pre-pit and a spot size Ws of said converged light used in information reproduction satisfy the following:

Wp<0833 Ws.

7. The information storage medium according to claim 1, wherein said pre-pit is displaced from an extension line of the pre-groove.

8. The information storage medium according to claim 7, wherein a width Wp of said pre-pit and a spot size Ws of said converged light used in information reproduction satisfy the following:

Wp=0.833 Ws.

9. The information storage medium according to claim 7, wherein a width Wp of said pre-pit and a spot size Ws of said converged light used in information reproduction satisfy the following:

Wp<0.833 Ws.

10. The information storage medium according to claim 8, wherein said pre-pit has substantially the same width as said pre-groove.

11. The information storage medium according to claim 9, wherein said pre-pit has substantially the same width as said pre-groove.

12. An information storage medium permitting reproduction of information with use of converged light, comprising:
    a pre-groove having a groove-like, continuous projection-and-recess shape; and
    a pre-pit having an intermittent projection-and-recess shape,
    wherein a depth of the pre-groove satisfies the following condition:

$$m\lambda/(2n)+\lambda/(8n) < dt < m\lambda/(2n)+3\lambda/(8n)$$

where
    m=an integer,
    n=a refractive index of a plastic base plate, and
    λ=a wavelength of a light beam to be used.

13. The information storage medium according to claim 12, wherein a width Wt of said pre-groove and a spot size Ws of said converged light used in information reproduction satisfy the following:

Wt<Ws.

14. An information reproducing apparatus capable of recording/reproducing, with use of converged light, information in/from an information storage medium having a pre-groove with a groove-like, continuous projection-and-recess shape, said pre-groove wobbling at a predetermined cycle, and a pre-pit with an intermittent projection-and-recess shape, said information storage medium permitting write or rewrite with use of converged light, said apparatus comprising:
    a first preamplifier which reproduces a signal from said pre-pit;
    a second preamplifier which reproduces a record mark formed by writing or rewriting information;
    a first digitizing circuit which digitizes said signal obtained from said first preamplifier; and
    a second digitizing circuit which digitizes a signal obtained from said second preamplifier,
    wherein at least one pair selected from the pair of said first and second preamplifiers and the pair of said first and second digitizing circuits are shared.

15. An information reproducing apparatus capable of recording/reproducing, with use of converged light, information in/from an information storage medium having a pre-groove with a groove-like, continuous projection-and-recess shape and a pre-pit with an intermittent projection-and-recess shape, said information storage medium permitting write or rewrite with use of converged light, said apparatus comprising:
    a first preamplifier which reproduces a signal from said pre-pit;
    a second preamplifier which reproduces a record mark formed by writing or rewriting information;
    a first digitizing circuit which digitizes said signal obtained from said first preamplifier; and
    a second digitizing circuit which digitizes a signal obtained from said second preamplifier,
    wherein at least one pair selected from the pair of said first and second preamplifiers and the pair of said first and second digitizing circuits are shared, and
    a ratio of an allowable amplitude variation in said second preamplifier, $(I_o-I\gamma)/(I\zeta-I\xi)$, satisfies the condition:

$$10 > (I_o-I\gamma)/(I\zeta-I\xi) > 1/10,$$

where
    $I\zeta$=a signal amount at a maximum level in a vertical range of a reproduction signal associated with the projection-and-recess in a region of said pre-groove or a non-pre-groove region,
    $I\xi$=a signal amount at a minimum signal level associated with an information mark, as compared to a level at which no light is returned, when an information mark of a predetermined shape is formed on said pre-groove region or said non-pre-groove region,
    $I\gamma$=an output signal from said second preamplifier in association with the projection-and-recess of a pre-groove portion or a non-pre-groove portion, and
    $I_o$=an output signal from said second preamplifier in association with a region without said projection-and-recess of said pre-groove portion or said non-pre-groove portion.

16. The information storage medium according to claim 15, wherein said ratio of an allowable amplitude variation in said second preamplifier, $(I_o-I\gamma)/(I\zeta-I\xi)$, satisfies the condition:

$$4 > (I_o-I\gamma)/(I\zeta-I\xi) > 1/4.$$

17. The information storage medium according to claim 16, wherein said ratio of an allowable amplitude variation in the second preamplifier, $(I_o-I\gamma)/(I\zeta-I\xi)$, satisfies the condition:

$$4 > (I_o-I\gamma)/(I\zeta-I\xi) > 1/4.$$

18. The information storage medium according to claim 14, wherein said ratio of an allowable amplitude variation in the second preamplifier, $(I_o-I\gamma)/(I\zeta-I\xi)$, satisfies the condition:

$$2 > (I_o-I\gamma)(I\zeta-I\xi) > 1/2.$$

19. The information storage medium according to claim 15, wherein said ratio of an allowable amplitude variation in the second preamplifier, $(I_o-I\gamma)/(I\zeta-I\xi)$, satisfies the condition:

$2 > (I_o - I\gamma)/(I\zeta - I\xi) > \frac{1}{2}$.

20. The information storage medium according to claim 1, wherein a depth and a height of said projection-and-recess of said pre-groove are equal to each other, and said depth and a height of said projection-and-recess of said pre-pit are equal to each other.

* * * * *